(Model.)
J. GRAVES.
ANTI FRICTION BEARING FOR SHAFTS.
No. 247,042. Patented Sept. 13, 1881.
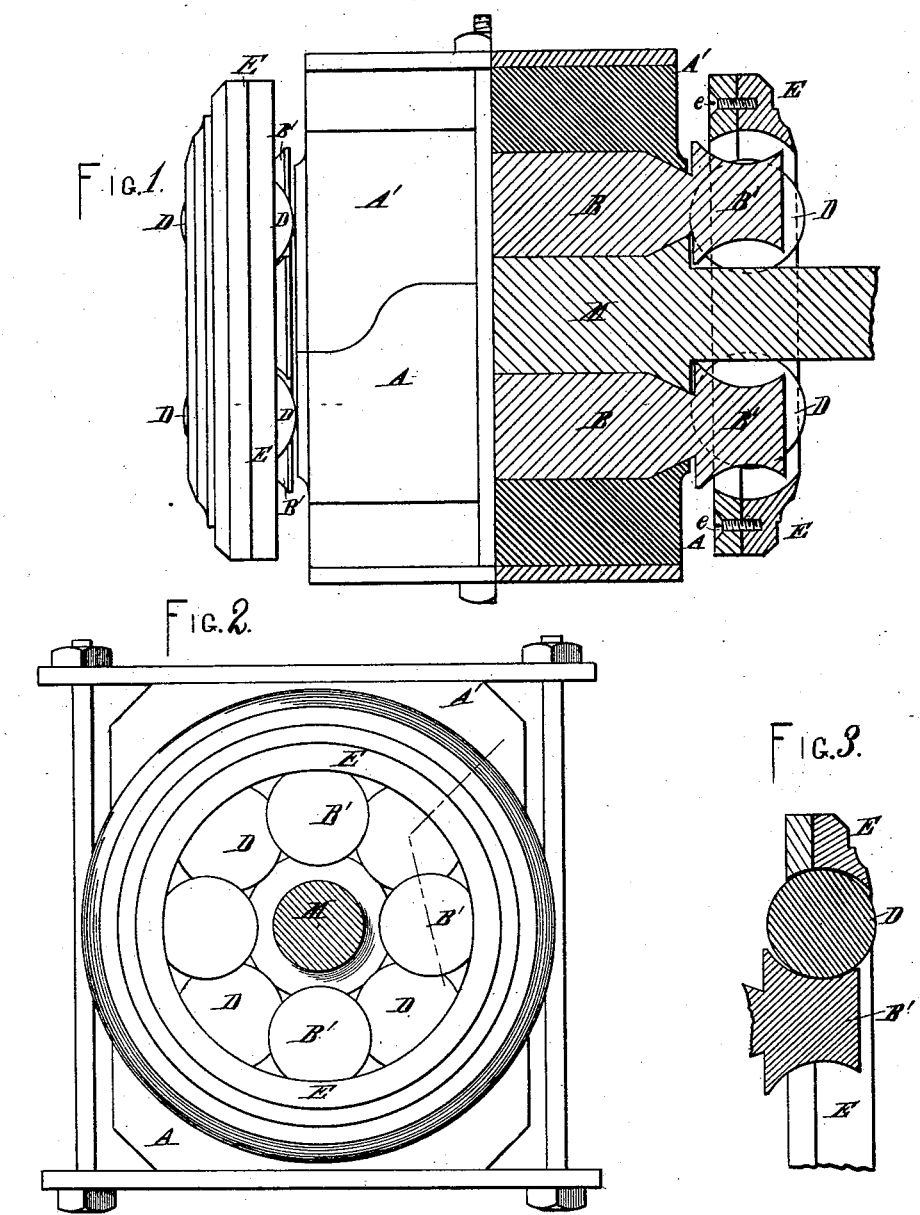
WITNESSES
Charles R. Searle,
Charles C. Stetson
INVENTOR
John Graves
by his attorney
Thomas L. Stetson

UNITED STATES PATENT OFFICE.

JOHN GRAVES, OF GREEN POINT, BROOKLYN, ASSIGNOR, BY MESNE ASSIGN-
MENTS, TO BENJAMIN G. HITCHINGS, OF GRAVESEND, NEW YORK.

ANTI-FRICTION BEARING FOR SHAFTS.

SPECIFICATION forming part of Letters Patent No. 247,042, dated September 13, 1881.

Application filed February 21, 1881. (Model.)

*To all whom it may concern:*

Be it known that I, JOHN GRAVES, of Green Point, Brooklyn, in the county of Kings and State of New York, have invented certain new and useful Improvements in Anti-Friction Bearings for Shafts; and I do hereby declare that the following is a full and exact description thereof.

The invention relates to the means for holding the several anti-friction rollers at a proper distance apart. I have devised a construction which attains this end with a high degree of perfection without involving any friction or exposing any small parts to wear.

I make all the anti-friction rollers longer than the bearings, and on the projecting end apply balls of similar or different material, of a size adapted to ride in the space between each roll and the next, but farther from the center of the main shaft, and so that its substance shall extend out farther from the main shaft than the substance of the rollers; and I inclose the whole in a loose ring at each end, which applies against the balls and rolls freely around with them at the high velocity of their extreme outer surfaces.

I make the projecting ends of the several rolls and the interior surfaces of the rings hollowed, so as to be able to retain the proper position of all the parts without contact with any other object.

The accompanying drawings form a part of this specification, and represent what I consider the best means of carrying out the invention.

Figure 1 is a side elevation, partly in section; Fig. 2, an end view, and Fig. 3 a detail.

Similar letters of reference indicate like parts in all the figures.

A is a firm pillow-block or fixed casting, forming the support for the bearing, and A' is a binder or top piece firmly bolted thereon, so that both shall in substance serve as a single substantial inclosure for the bearing. Both are turned out so that the rollers B can traverse smoothly around therein and inclose and support the shaft M and turn therewith in the obvious manner. The shaft M is the main shaft, supposed to be large and turning rapidly with a heavy load, but which may be small and lightly or irregularly loaded and turning slowly or with various velocities, so long as it is of sufficient consequence to make it expedient to reduce the friction by anti-friction rollers, as shown at B. These anti-friction rollers B project at each end beyond the limits of the blocks A and A'. I will designate the projecting ends by the further symbol B'. All project to an equal extent, and the peripheries are formed with a shallow groove around, adapted to nearly match to the surfaces of the balls D. All the ends B' are turned alike. The balls D are turned perfectly spherical and of uniform size. They are applied, as shown, relatively to the rollers B B', and are caged in the proper relations by the loose rings E. The interior of each ring E is hollowed to nearly match the balls. The forms of the surfaces of B' and E, where they bear on the balls D, are clearly shown in Fig. 1, as also a peculiarity in the construction of the rings E, which facilitates the assembling and the separating of the parts as required, and affords facilities for taking up the slack, if any arises from wear.

Each ring E is made in two parts applying together axially, as shown, and held together firmly by any efficient means, as screws $e$, so as to serve in effect as a unit for working, but to allow of complete separation and reunion when required. On first putting up the parts these halves may be slightly separated by a piece of thin metal (not shown) simply interposed between, with the screws $e$ extending through. After the work has been running awhile the halves of the ring E are separated and the interposed metal removed. On again applying the parts together, the groove for the balls is narrowed, which will have the effect to take up the slack and again induce a tight and perfect contact of the ring E with all the balls D of the series. If a further tightening is required, the parts of the ring E are again separated, and the abutting faces planed, filed, or scraped to allow the halves to fit together still closer.

I prefer to give the interior of the fixed parts A A' the form shown, and to give a corresponding form to the rollers D bearing thereon, as it aids the device in resisting end strains; but I do not esteem such form absolutely necessary.

The device may be worked with some success with the bearing parts of the blocks A A' hollowed perfectly cylindrical, and with the bearing parts of the rolls B similarly plain.

Various modifications may be made in the forms of the details so long as they do not prevent the device from serving as specified. Obviously the number and sizes of the rolls B B' and of the balls D may be greatly varied, so long as they and the main shaft and the inclosure A A' properly match.

I believe that some portion of the advantages of the invention may be attained by short rollers in place of the balls D, and giving a corresponding form to the ends B' of the rolls B, and a corresponding form to the interior of the ring E; but I prefer the balls, as much less likely to get deranged in position. Ordinarily the strain on these balls is very light.

I claim as my invention—

1. The spheres or balls D, in combination with the free inclosing-ring E, and with the rollers B B' and inclosure A A', and arranged, as shown, relatively to each other and to the inclosed main shaft M, and adapted to serve as herein specified.

2. The ring E, formed in two parts, joined by the screws e, or other removable fastenings, arranged to allow the adjusting of the width of the ring E, and thereby to take up the slack, as also to promote the assembling and separation of the balls D, rollers B B', fixed masses A A', and main shaft M, as herein specified.

In testimony whereof I have hereunto set my hand, this 7th day of January, 1880, in the presence of two subscribing witnesses.

JOHN GRAVES.

Witnesses:
HY. H. SPELMAN,
THOMAS D. STETSON.